No. 734,548. PATENTED JULY 28, 1903.
H. HALSEY.
ELECTRIC BATTERY.
APPLICATION FILED APR. 18, 1902.
NO MODEL.

WITNESSES:
Robert H. Ireland
Lester C. Taylor

INVENTOR
Henry Halsey
BY
C. W. Edwards
ATTORNEY.

No. 734,548. Patented July 28, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 734,548, dated July 28, 1903.

Application filed April 18, 1902. Serial No. 103,645. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to batteries, and especially to that class of batteries wherein means are provided for maintaining movement of the elements or the electrolyte.

The object of the present invention is to provide a battery of this class wherein all the parts shall be simple and readily fitted together and wherein the interior of the battery will be readily accessible without necessitating a substantially complete dismantling of the battery.

The invention also comprehends novel means for brushing the elements and for establishing movement of the electrolyte.

The invention will be more fully described with reference to the form thereof shown in the accompanying drawings, in which—

Figure 1:
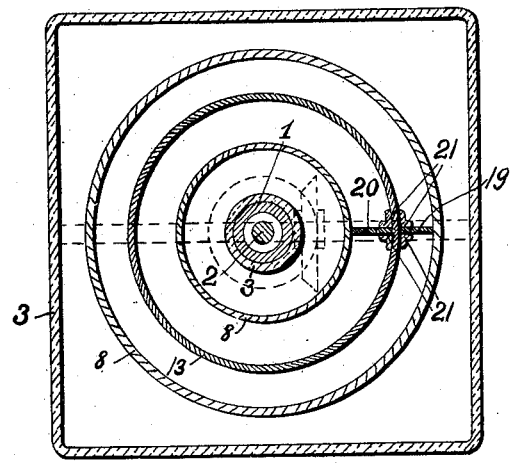
Figure 2:
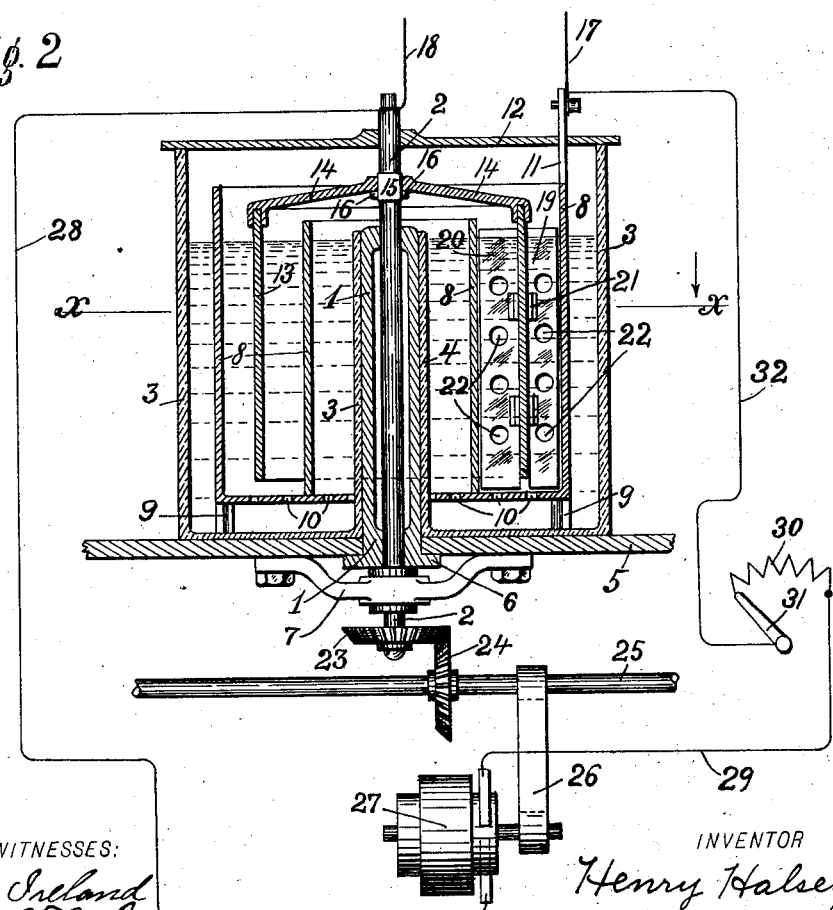

Figure 1 is a top sectional view of a battery-cell embodying my invention, said section being taken upon the line X X of Fig. 2; and Fig. 2 is a sectional view of the same.

In the drawings, 1 represents a suitable pedestal upon which the battery-case is to be mounted. This pedestal also serves as a bearing for the shaft 2. Upon the pedestal is fitted the battery-case 3, the case having a reëntrant portion 4, which fits upon the pedestal 1. The case may be fitted upon the pedestal in any suitable manner. A convenient arrangement, however, is that shown in the drawings, wherein the flooring 5, upon which the battery is to be mounted, rests against the flange 6 upon the lower end of the pedestal and the bottom of the case 3 rests upon the flooring 5. An additional bearing 7 is mounted upon the flooring 5 and serves to steady the shaft 2. One of the elements 8 of the battery, preferably the zinc, rests upon the bottom of the case, being suitably arranged to permit free circulation of the electrolyte between the parts. In the present instance the element 8 rests upon the legs 9 and the perforations 10 10 permit free circulation of the electrolyte. A conducting-strip 11 projects upward from the element 8 and passes through a suitable opening in the cover 12. The other element, 13, of the battery—in this instance the carbon element—is hung upon a spider 14, which is fitted upon and revolves with the shaft 2. In the arrangement shown in the drawings a portion 15 of the shaft 2 is rectangular in cross-section, and the central opening of the spider 14 is also rectangular and fits upon the portion 15 of shaft 2. The spider rests against the lugs 16. The conductor 17 for the external circuit of the battery is connected to the conducting-strip 11, and the conductor 18 is connected to the end of the shaft 2. Upon the element 13 are mounted the brushes 19 and 20, composed of any suitable material—such, for example, as hard rubber—each of which brushes projects outward and upward and preferably lightly contacts with the elements 8. The brush may be of any suitable form and may be mounted upon the element 13 in any suitable manner. In the drawings the brushes are mounted vertically upon the element; but in practice in many cases it will be found desirable to mount the brushes spirally, the top of the brush beginning near the top of the element and the brush winding around the element downward toward the bottom. In the drawings the clamps 21 serve to hold the brushes in position upon the element. Perforations 22 22 are also provided in order that the brushes will present a minimum of resistance to the electrolyte; but the use of these perforations and their contour and area, if used, will depend upon individual circumstances.

The gear-wheel 23, carried by shaft 2, meshes with the gear-wheel 24, mounted upon shaft 25. Shaft 25 is driven in this instance by a belt 26 from the motor 27. The motor-circuit is as follows: from shaft 2 by wire 28 to the motor; from the motor 27, by wire 29, rheostat 30, rheostat-arm 31, and wire 32 to the conducting-strip 11.

The cell is assembled by first slipping the case in position upon the pedestal 1 and placing the element 8 in position. Element 14 is then slipped over shaft 2 and placed in position upon the rectangular portion 15. The electrolyte having been poured in, the cover 12 is fitted on. To fit the cover in place, the only manipulation necessary is to see that the shaft 2 and conducting-strip 11 project through the proper openings in the cover. The cover having been placed in position, the wires are connected to the respective contacts. When the battery-circuit is closed, the motor-circuit will also be closed through the rheostat-arm 31. The initial output of the battery will always be sufficient to start the motor, which through shaft 25 and gears 24 and 23 rotates shaft 2, and thus rotates the element 14, causing brushes 19 and 20 to move the electrolyte around in the angular channel between the elements and also to mechanically brush the active surfaces of the elements 8. It is not essential that the brushes shall make contact with the elements 8, for in such case the movement of the electrolyte will be sufficient to prevent polarization of the battery. As the speed of the motor increases the polarization decreases, and hence the output of the battery will be maintained constant at a constant speed of the motor. The output of the battery may be varied in the usual manner by resistance in the external circuit or by varying the speed of the motor, and consequently varying the speed at which element 13 rotates.

It will be understood that the invention above described is capable of various modifications, and I therefore desire it to be understood that I do not limit myself herein to the precise construction shown.

Having thus described my invention, I declare that what I claim as new, and desire to secure by Letters Patent, is—

1. In a battery, the combination of a casing having a reëntrant portion, a shaft mounted therein, a cylindrical element mounted upon said shaft, a similarly-formed element supported in the casing, opposite said first-named element, an electrolyte between the same, and means for rotating the shaft, substantially as described.

2. In a battery, the combination of a pedestal, a shaft having bearings in said pedestal, a casing adapted to be supported on said pedestal, an element supported in said casing, an element supported upon said shaft, said elements being cylindrical and concentrically arranged, an electrolyte surrounding said elements, and means for rotating said shaft, substantially as described.

3. In a battery, the combination of a pedestal, a shaft having bearings in said pedestal, a casing adapted to be supported on said pedestal, an element supported in said casing, an element supported upon said shaft, said elements being cylindrical and concentrically arranged, an electrolyte surrounding said elements, one of said elements carrying a brush which contacts with the other element, and means for rotating said shaft, substantially as described.

4. In a battery, the combination with a cell containing an electrolyte, of a stationary element supported in said cell, a vertical shaft entering said receptacle from the bottom thereof, a tubular element supported upon said shaft and surrounding the same, and means, outside of the cell, for rotating said shaft, substantially as described.

5. In a battery, the combination with a cell containing an electrolyte, of a stationary element supported in said cell, a vertical shaft entering said receptacle from the bottom thereof, a tubular element supported upon said shaft and surrounding the same, a brush or brushes mounted on said tubular element, and means, outside of the cell, for rotating said shaft, substantially as described.

6. In a battery, the combination of a vertical shaft, means for imparting motion to the same, a bearing for said shaft, a cell supported upon said bearing, an electrolyte in said cell, and elements in said electrolyte, one of said elements being mounted upon said shaft, substantially as described.

7. In a battery, the combination of a cell containing an electrolyte, and two cylindrical elements, one of which surrounds the other, means for imparting movement to one of said elements, and a brush or brushes carried by said movable element, substantially as described.

8. In a battery, the combination of a rotatable shaft, a bearing therefor, a cell adapted to be supported upon said bearing and having a reëntrant portion, and an electrolyte and battery elements in said cell, one of said elements being supported upon said shaft, substantially as described.

In testimony whereof I affix my signature in presence of two witnesses.

HENRY HALSEY.

Witnesses:
 HENRY BEST,
 C. V. EDWARDS.